United States Patent [19]

Tate et al.

[11] 4,003,324
[45] Jan. 18, 1977

[54] END TRIMMER

[75] Inventors: Oliver C. Tate, Darien; Oliver J. Tysver, Flossmoor, both of Ill.

[73] Assignee: The Continental Group, Inc., New York, N.Y.

[22] Filed: Feb. 4, 1976

[21] Appl. No.: 655,177

[52] U.S. Cl. .................. 113/7 R; 113/120 N
[51] Int. Cl.² ............................ B21D 51/26
[58] Field of Search .............. 113/7 R, 120 N

[56] References Cited
UNITED STATES PATENTS 3,838,653   10/1974   Larkin et al. ............... 113/7 R

*Primary Examiner*—Willie G. Abercrombie
*Attorney, Agent, or Firm*—Paul J. Lerner; Joseph E. Kerwin; John J. Kowalik

[57] ABSTRACT

An improved can end trimmer provides for positioning a trimming knife on a rotating spindle in a manner such that it may be adjusted to proper alignment with another knife by means of a spacer fitting. The invention further allows for the removal or replacement of the trimming knives without the necessity of alignment adjustments.

4 Claims, 7 Drawing Figures

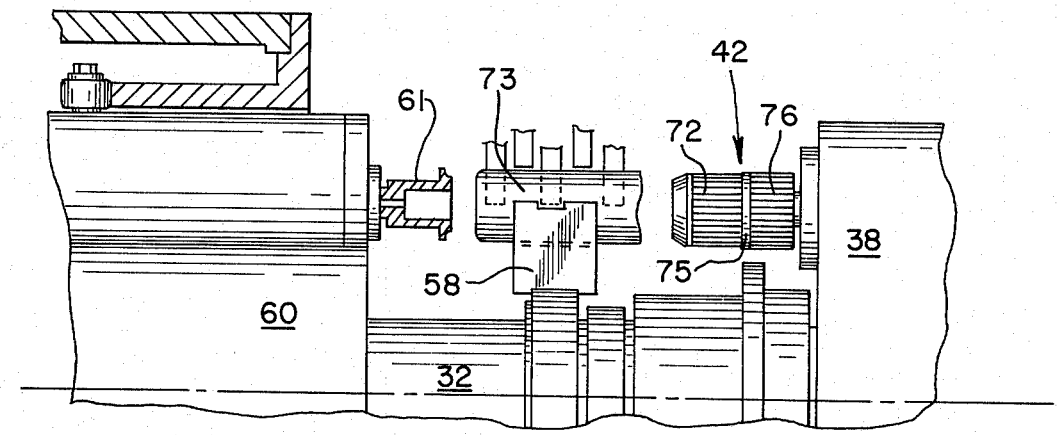
FIG_4_
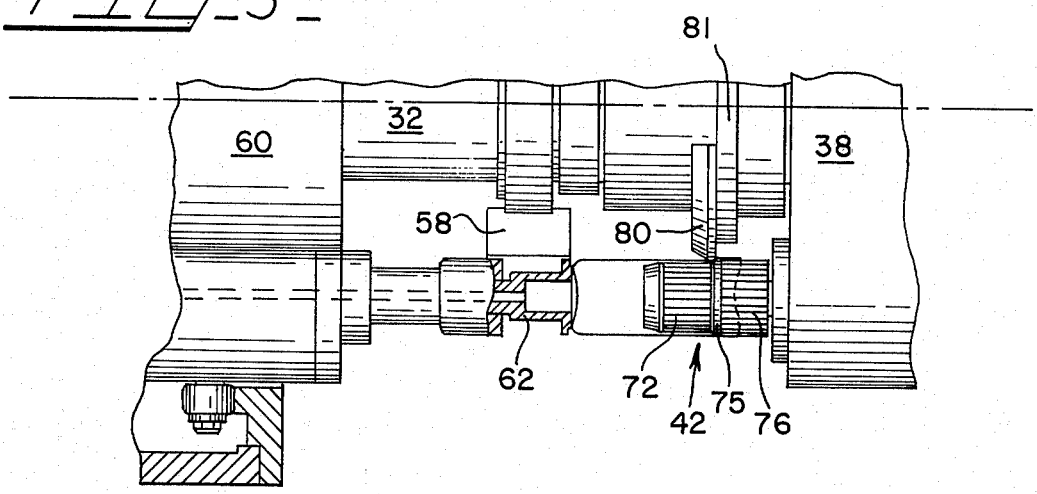
FIG_5_
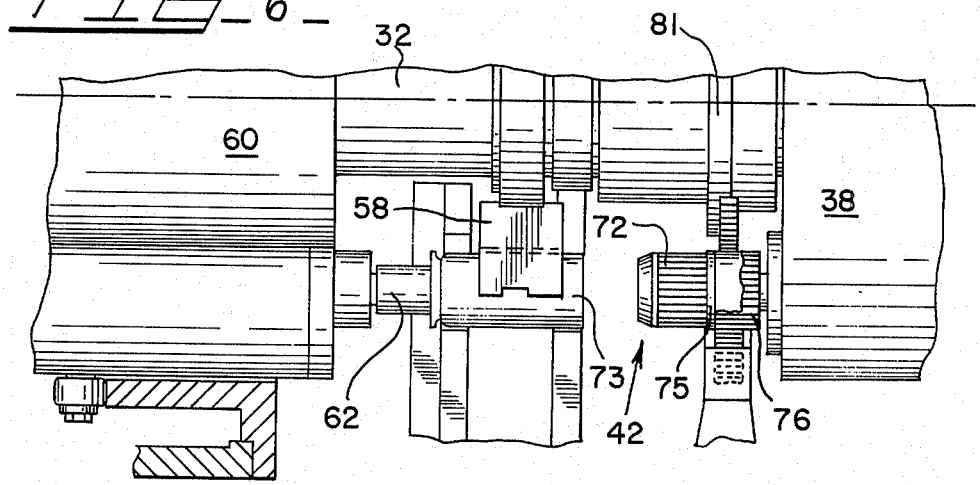
FIG_6_

END TRIMMER

FIELD OF THE INVENTION

The present invention pertains generally to can making apparatus and, more specifically, to apparatus for trimming the open end of a preformed can body.

SUMMARY OF THE INVENTION

As initially preformed, aluminum or steel can bodies are of non-uniform height and/or have irregular edges at the open end thereof. It is an object of the present invention to provide improved apparatus for rapidly and accurately shearing or trimming an end portion from the open end of a preformed can.

The apparatus of the present invention comprises an expandable spindle unit which is rotated about its horizontal axis and which is revolved in a circular orbit. Secured to the spindle is an annular cutter element or inner knife and disposed in the path of movement thereof is a stationary cutter element or outer knife. During motion of the spindle unit, the annular and stationary cutter elements cooperate for shearing an end portion from the open end of a can disposed in a predetermined position over the annular cutter element.

Can trimming apparatii are known in the art, as, for example, U.S. Pat. Nos. 3,425,251 and 3,878,743. After a period of use, the cutter elements of these devices become dulled and require sharpening or replacement. These operations have heretofore involved time consuming adjustment operations to reestablish the critical axial relation between the cutter elements and the spindle before production may be resumed.

It is, therefore, a primary object of the present invention to provide an improved can trimming machine which permits rapid removal and replacement or re-sharpening of the cutter elements without subsequent alignment adjustments.

With the above and other objects in view that will hereinafter appear, the nature of the invention will be more readily understood by reference to the following description, the claims and the several views in the accompanying drawings.

BRIEF DESCRIPTION OF THE DRAWINGS

FIG. 4 is a fragmentary side plan view of the can feed mechanism illustrating one step in placing an untrimmed can on a spindle.

FIG. 5 is a fragmentary side plane view similar to FIG. 4, illustrating a trimmed can being removed from a spindle.

FIG. 6 is a fragmentary side plan view, similar to FIG. 5, illustrating the trimmed band portion of the can being broken apart.

DESCRIPTION OF THE PREFERRED EMBODIMENT

Figure 1:
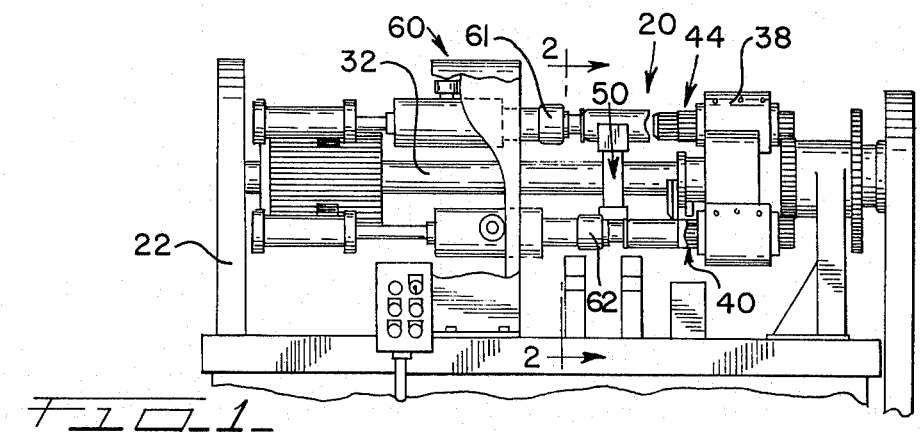
FIG. 1 is a side plan view of the end trimming machine of the present invention.
Figure 2:
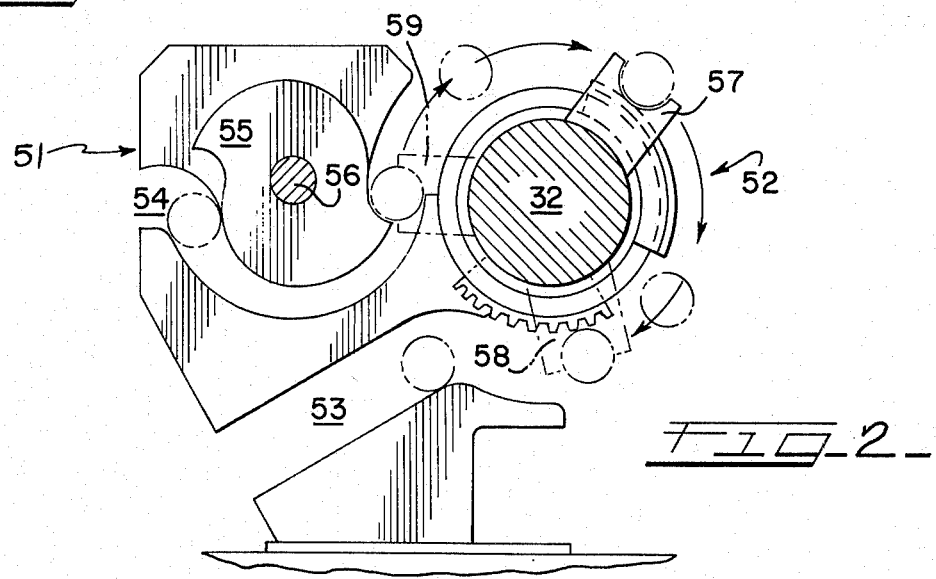
FIG. 2 is a cross-sectional view taken substantially along line 2—2 of FIG. 1, illustrating a portion of the can feed mechanism.

Referring now to FIG. 1, there is indicated generally by the reference numeral 20 can trimming apparatus incorporating the present invention.

A horizontal main shaft 32 is rotatably mounted on a frame 22 and driven by a motor and gear train (not shown).

Mounted near an end of the main shaft 32, for rotation therewith, is a turret-like headstock assembly 38 which comprises three circumferentially spaced headstock units 40, 42 and 44.

Near the center of the main shaft 32 is the can feed mechanism 50 comprising an infeed assembly 51, a rotating holder 52 and an outfeed channel 53. The infeed assembly includes an infeed channel 54 and a two pocket transfer feed turret 55 which rotates about a shaft 56 parallel to the main shaft 32. The holder 52, which is mounted on the main shaft 32, comprises three circumferentially spaced gripping units 57, 58 and 59 which are aligned with the headstock units 40, 42 and 44.

A ram turret 60 is mounted on the main shaft 32, at the end thereof away from the headstock assembly 38, and rotates therewith. Rams 61, 62 and 63 are mounted on the turret 60 and align with the headstock units 40, 42 and 44 and the gripping units 57, 58 and 59.

Figure 3:
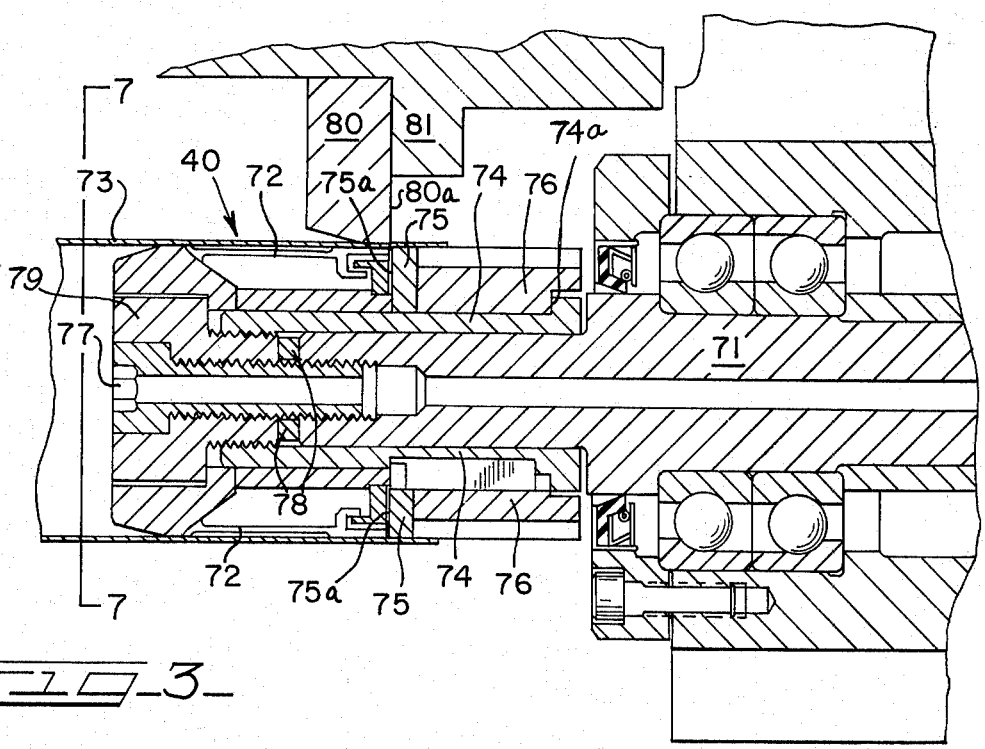
FIG. 3 is a fragmentary cross-sectional view of a spindle unit illustrating the spacer fitting and inner knife attachment means.
Figure 7:
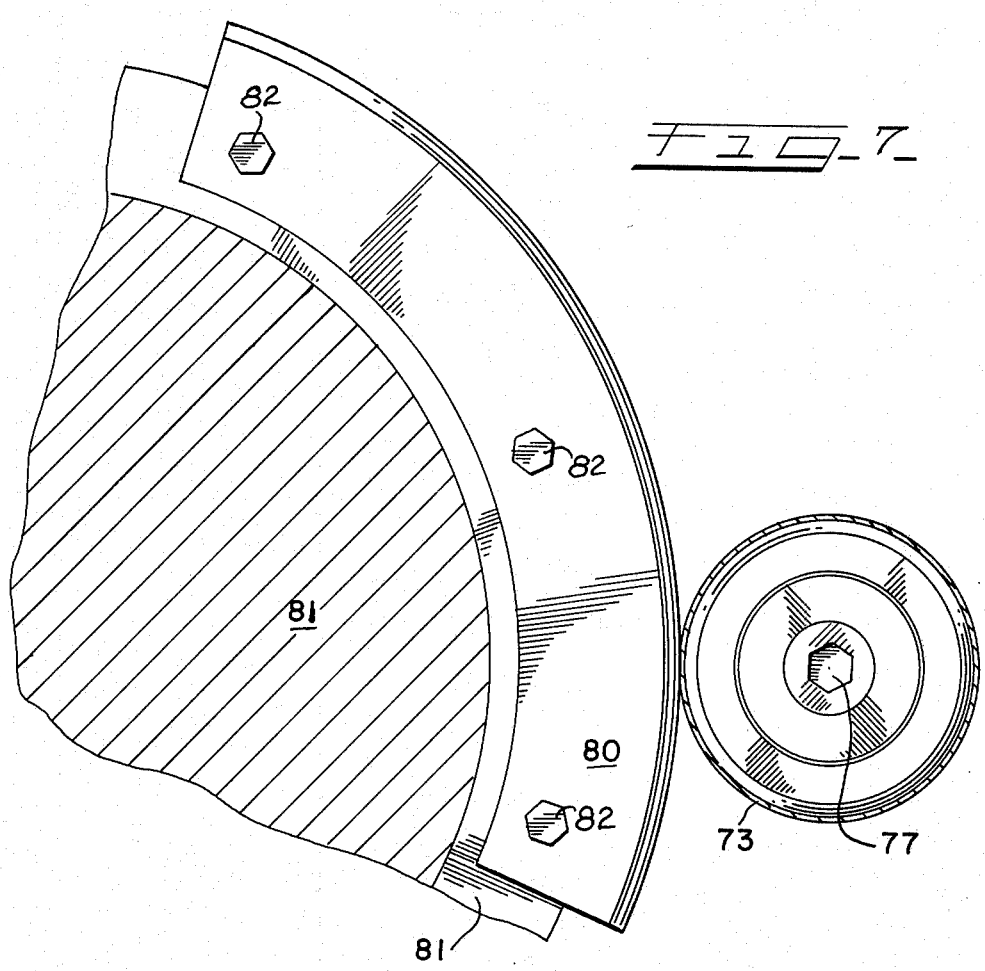
FIG. 7 is a cross-sectional view taken substantially along line 7—7 of FIG. 3.

Since the three headstock units 40, 42 and 44 are identical in construction and operation, only the headstock unit 40 will be described in detail. As best shown in FIG. 3, the headstock unit 40 comprises a shaft 71 parallel to the main shaft 32. Mounted on an end of the shaft 71 is an expandable spindle 72 configured to hold a can 73 during trimming. The spindle 72 is attached to the shaft 71 by a bolt 77 and a clamping screw 79. A ring or washer-shaped spacer fitting 78 is mounted on the bolt 77 between the clamping screw 79 and the shaft 71.

A collar 74 surrounds the shaft 71, intermediate the ends thereof. The collar 74 is keyed to the shaft 71 so as to insure rotation therewith, while permitting axial adjustment of the collar 74 relative to the shaft 71 and clamping screw 79. A ring-like or washer-shaped annular inner knife or cutting element 75 is mounted on the collar 74 abutting the spindle 72. Also mounted on the collar 74, abutting the inner knife 75 on the side thereof away from the spindle 72, is a knurling gear 76.

An outer knife or cutting element 80 is bolted to a mounting 81 on the frame 22 and cooperates with the inner knife 75 to shear the can 73 therebetween.

After a period of use, the cutter elements 75 and 80 become dulled and require sharpening or replacement. Sharpening is accomplished by grinding the cutting faces 75a and 80a of the knives 75 and 80. This causes a change in the dimensions of the knives 75 and 80 which in conventional installations destroys the critical axial shearing relationship alignment between the knives 75 and 80 and the spindle 72. In the prior art, proper alignment was reestablished by a costly and time consuming manual adjustment process.

In the present invention, the outer knife 80 is fixed with the cutting face 80a in its proper alignment with the shaft 71. The use of the mounting 81 abutting the face 80a comprises a simple means of providing a reference plane establishing and maintaining a fixed predetermined relationship after sharpening or replacement of the knife 80. All that is needed to bring the outer knife 80 to the proper position after sharpening is to tighten the bolts 82 to bring the cutting face 80a against the mounting 81.

The spindle 72 is maintained in alignment by the spacer fitting 78. Once the fitting 78 has been ground to the proper dimensions viz. thickness, the spindle 72 may be maintained in proper axial relation to the shaft 71 by merely tightening the bolt 77. Due to variations in dimension of the components of each shaft and spindle, the thickness of the fitting will vary from spindle to spindle. The fitting thus provides a rapid and easy means of compensating for such variations.

The inner knife 75 is clampingly held in its proper axial position by a shoulder 74a, formed on the collar 74, which locks the knurling gear 76 and the knife 75 into position with the cutting face 75a of the knife 75 abutting the spindle 72. If the thickness of the inner knife 75 is reduced during sharpening, the collar 74 is advanced toward the spindle 72 by rotating the clamping screw 79, until the knife 75 is again locked against the spindle 72 and the proper alignment of the cutting face 75a is achieved.

In operation of the trimming machine, an untrimmed can is fed into the infeed channel 54 wherein it is urged upwardly by the rotating transfer feed turret 55 and into one of the gripping units 57, 58 or 59, for example unit 57.

As described previously, the gripping units 57, 58 and 59 are mounted on the rotating main shaft 32. As the can-bearing gripping unit 57 rotates, the ram 61 advances to urge the can onto the headstock unit 40.

As the shaft 32 continues to rotate, the can-bearing headstock unit passes the outer knife 80. As the can is rotated against the knife 80, a portion is sheared away by the cooperating inner and outer knives 75 and 80. The trimmed portion of the can, which remains on the knurling gear 76, is broken and serrated or knurled by the knurling gear 76 cooperating with a fixed gear (not shown) on the frame 22. The broken and serrated scrap thereupon falls into a vacuum scrap chute (not shown).

As the main shaft 32 rotates further, ram 61 draws the trimmed can from the headstock unit 80 and allows it to fall into the outfeed channel 53.

We claim:

1. A can trimming machine including a stationary frame, a rotatable shaft, a spindle mounted on an end of said shaft for rotation about a longitudinal axis, a ring-shaped replaceable inner knife on said shaft coaxial with said spindle for rotation therewith, a replaceable stationary outer knife removably mounted on the frame in cooperative shearing relation with said inner knife to trim a can body to a predetermined length, said knives being sharpenable with attendant dimensional reduction axially of the shaft, said spindle and said frame having axially immovable counterfacing alignment surfaces thereon, means for reestablishing and maintaining said spindle in a predetermined axial relation to said shaft and said alignment surface on said frame subsequent to variation of the dimensions of said knives, and adjustable means for reestablishing and maintaining the cutting faces of said knives in abutting relation to said alignment surfaces, said spindle being attached to said shaft by a bolt or similar member and said spindle spacing means comprising a precisely dimensioned spacer fitting mounted on said member between said shaft and said spindle, said knife spacing means comprising a collar mounted on said shaft, said collar being axially adjustable relative to said shaft, and said inner knife is sleeveably mounted on said collar and movable with respect thereto.

2. The machine of claim 1, wherein said collar is formed with an annular shoulder and said collar is advanced toward said spindle to clamp said inner knife into position with the cutting face thereof abutting said spindle.

3. The machine of claim 1, wherein said collar is fixed to said shaft for rotation therewith.

4. The machine of claim 1, wherein said spindle is radially expandable for gripping said can body.

* * * * *